United States Patent
Anderson et al.

(10) Patent No.: US 8,560,476 B2
(45) Date of Patent: Oct. 15, 2013

(54) MARTINGALE CONTROL OF PRODUCTION FOR OPTIMAL PROFITABILITY OF OIL AND GAS FIELDS

(75) Inventors: Roger N. Anderson, New York, NY (US); Albert Boulanger, New York, NY (US); Wei He, Tappan, NY (US); Ulisses Mello, Yorktown Heights, NY (US); Liqing Xu, Tenafly, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 679 days.

(21) Appl. No.: 12/019,347

(22) Filed: Jan. 24, 2008

(65) Prior Publication Data

US 2008/0294387 A1  Nov. 27, 2008

Related U.S. Application Data

(63) Continuation-in-part of application No. 11/349,711, filed on Feb. 8, 2006, now Pat. No. 7,395,252, which is a continuation of application No. PCT/US2004/028185, filed on Aug. 26, 2004.

(60) Provisional application No. 60/886,453, filed on Jan. 24, 2007, provisional application No. 60/497,834, filed on Aug. 26, 2003.

(51) Int. Cl.
| | |
|---|---|
| *G06F 17/00* | (2006.01) |
| *G06N 5/00* | (2006.01) |
| *G06G 7/48* | (2006.01) |

(52) U.S. Cl.
USPC .............................................. 706/45; 703/10

(58) Field of Classification Search
USPC ........................................................ 706/45
See application file for complete search history.

(56) References Cited

U.S. PATENT DOCUMENTS

| 5,225,712 A | 7/1993 | Erdman |
| 5,625,751 A | 4/1997 | Brandwajn et al. |

(Continued)

FOREIGN PATENT DOCUMENTS

| WO | WO/93/03401 | 2/1993 |
| WO | WO/2007/087537 | 2/2007 |
| WO | WO/2007/136456 | 11/2007 |

OTHER PUBLICATIONS

Saputelli, L. M. Nikolaou, and M.J. Economides "Real-time Reservoir management: A multiscale adaptive optimization and control approach" [online] Downloaded Nov. 29, 2010. Computational Geosciecnes Springer 2006 http://www.springerlink.com/content/4175n8841743684v/fulltext.pdf.*

(Continued)

*Primary Examiner* — Ben Rifkin
(74) *Attorney, Agent, or Firm* — Baker Botts, LLP (57) ABSTRACT

A computer-aided lean management (CALM) controller system recommends actions and manages production in an oil and gas reservoir/field as its properties and conditions change with time. The reservoir/field is characterized and represented as an electronic-field ("e-field"). A plurality of system applications describe dynamic and static e-field properties and conditions. The application workflows are integrated and combined in a feedback loop between actions taken in the field and metrics that score the success or failure of those actions. A controller/optimizer operates on the combination of the application workflows to compute production strategies and actions. The controller/optimizer is configured to generate a best action sequence for production, which is economically "always-in-the-money."

15 Claims, 9 Drawing Sheets

(56) References Cited

U.S. PATENT DOCUMENTS

| | | | |
|---|---|---|---|
| 5,764,155 A | 6/1998 | Kertesz et al. | |
| 5,862,391 A | 1/1999 | Salas et al. | |
| 5,875,431 A | 2/1999 | Heckman et al. | |
| 5,893,069 A | 4/1999 | White et al. | |
| 5,959,547 A | 9/1999 | Tubel et al. | |
| 5,963,457 A | 10/1999 | Kano et al. | |
| 6,012,016 A | 1/2000 | Bilden et al. | |
| 6,125,044 A | 9/2000 | Cherniski et al. | |
| 6,125,453 A | 9/2000 | Wyss | |
| 6,154,731 A | 11/2000 | Monks et al. | |
| 6,169,981 B1 | 1/2001 | Werbos | |
| 6,266,619 B1 * | 7/2001 | Thomas et al. | 702/13 |
| 6,308,162 B1 | 10/2001 | Ouimet et al. | |
| 6,311,144 B1 | 10/2001 | Abu El Ata | |
| 6,321,205 B1 | 11/2001 | Eder | |
| 6,434,435 B1 | 8/2002 | Tubel et al. | |
| 6,519,568 B1 | 2/2003 | Harvey et al. | |
| 6,629,044 B1 | 9/2003 | Papallo, Jr. et al. | |
| 6,772,211 B2 | 8/2004 | Lu et al. | |
| 6,807,537 B1 | 10/2004 | Thiesson et al. | |
| 6,826,483 B1 * | 11/2004 | Anderson et al. | 702/13 |
| 6,829,384 B2 | 12/2004 | Schneiderman et al. | |
| 6,944,678 B2 | 9/2005 | Lu et al. | |
| 7,106,045 B2 | 9/2006 | Jungwirth et al. | |
| 7,130,832 B2 | 10/2006 | Bannai et al. | |
| 7,132,623 B2 | 11/2006 | De Miranda et al. | |
| 7,233,843 B2 | 6/2007 | Budhraja et al. | |
| 7,236,953 B1 | 6/2007 | Cooper et al. | |
| 7,274,975 B2 | 9/2007 | Miller | |
| 7,369,950 B2 | 5/2008 | Wall et al. | |
| 7,395,252 B2 | 7/2008 | Anderson et al. | |
| 7,467,119 B2 | 12/2008 | Saidi et al. | |
| 7,519,506 B2 | 4/2009 | Trias | |
| 7,555,454 B2 | 6/2009 | Cooper et al. | |
| 7,590,472 B2 | 9/2009 | Hakim et al. | |
| 7,873,567 B2 | 1/2011 | Eder | |
| 7,925,557 B1 | 4/2011 | Ficery et al. | |
| 7,945,524 B2 | 5/2011 | Anderson et al. | |
| 8,036,996 B2 | 10/2011 | Long et al. | |
| 8,116,915 B2 | 2/2012 | Kempton | |
| 8,305,737 B2 | 11/2012 | Ewing et al. | |
| 2001/0049651 A1 * | 12/2001 | Selleck | 705/37 |
| 2002/0001307 A1 | 1/2002 | Nguyen et al. | |
| 2002/0084655 A1 | 7/2002 | Lof et al. | |
| 2002/0087234 A1 | 7/2002 | Lof et al. | |
| 2002/0198627 A1 | 12/2002 | Nasman et al. | |
| 2003/0130755 A1 | 7/2003 | Bazzocchi et al. | |
| 2003/0171851 A1 | 9/2003 | Brickfield et al. | |
| 2003/0188208 A1 | 10/2003 | Fung | |
| 2004/0143477 A1 | 7/2004 | Wolff | |
| 2004/0158417 A1 | 8/2004 | Bonet | |
| 2004/0158772 A1 | 8/2004 | Pan et al. | |
| 2004/0163895 A1 | 8/2004 | Kostka et al. | |
| 2004/0267395 A1 | 12/2004 | Discenzo et al. | |
| 2005/0033707 A1 | 2/2005 | Ehlers et al. | |
| 2005/0034023 A1 | 2/2005 | Maturana et al. | |
| 2005/0207081 A1 | 9/2005 | Ying | |
| 2006/0106797 A1 | 5/2006 | Srinivasa et al. | |
| 2006/0168398 A1 | 7/2006 | Cadaret | |
| 2006/0259199 A1 | 11/2006 | Gjerde et al. | |
| 2006/0288260 A1 | 12/2006 | Xiao et al. | |
| 2007/0094187 A1 | 4/2007 | Anderson et al. | |
| 2007/0177508 A1 | 8/2007 | Croak et al. | |
| 2007/0192078 A1 | 8/2007 | Nasle et al. | |
| 2007/0198108 A1 | 8/2007 | Nair et al. | |
| 2007/0271006 A1 | 11/2007 | Golden et al. | |
| 2008/0039980 A1 | 2/2008 | Pollack et al. | |
| 2008/0109205 A1 | 5/2008 | Nasle | |
| 2008/0126171 A1 | 5/2008 | Baldwin et al. | |
| 2008/0167756 A1 | 7/2008 | Golden et al. | |
| 2008/0177678 A1 | 7/2008 | Di Martini et al. | |
| 2008/0183339 A1 | 7/2008 | Vaswani et al. | |
| 2008/0250265 A1 | 10/2008 | Chang et al. | |
| 2008/0281663 A1 | 11/2008 | Hakim et al. | |
| 2008/0294387 A1 | 11/2008 | Anderson et al. | |
| 2008/0319923 A1 | 12/2008 | Casey et al. | |
| 2009/0063094 A1 | 3/2009 | Havener et al. | |
| 2009/0063122 A1 | 3/2009 | Nasle | |
| 2009/0076749 A1 | 3/2009 | Nasle | |
| 2009/0113049 A1 | 4/2009 | Nasle et al. | |
| 2009/0157573 A1 | 6/2009 | Anderson et al. | |
| 2009/0240380 A1 | 9/2009 | Shah et al. | |
| 2010/0106641 A1 | 4/2010 | Chassin et al. | |
| 2010/0107173 A1 | 4/2010 | Chassin | |
| 2010/0114387 A1 | 5/2010 | Chassin | |
| 2010/0207728 A1 | 8/2010 | Roscoe et al. | |
| 2010/0306014 A1 | 12/2010 | Chow | |
| 2010/0332373 A1 | 12/2010 | Crabtree et al. | |
| 2011/0175750 A1 | 7/2011 | Anderson et al. | |
| 2011/0231213 A1 | 9/2011 | Anderson et al. | |
| 2011/0264276 A1 | 10/2011 | Kressner et al. | |
| 2011/0282703 A1 | 11/2011 | Chow et al. | |
| 2012/0029677 A1 | 2/2012 | Havener et al. | |
| 2012/0072039 A1 | 3/2012 | Anderson et al. | |
| 2013/0080205 A1 | 3/2013 | Anderson et al. | |

OTHER PUBLICATIONS

U.S. Appl. No. 11/349,711 Mar. 13, 2008 Issue Fee payment.
U.S Appl. No. 11/349,711, Feb. 22, 2008 Notice of Allowance.
U.S. Appl. No. 11/349,711, Dec. 14, 2007 Response to Non-Final Office Action.
U.S Appl. No. 11/349,711, Aug. 17, 2007 Non-Final Office Action.
Begg et al., "The Value of Flexibility in Managing Uncertainty in Oil and gas Investments", *SPE 77586*, 2002, pp. 1-10.
U.S. Appl. No. 12/885,800 Feb. 21, 2013 Final Office Action.
International Search Report and Written Opinion for PCT/US2012/056321, dated Dec. 7, 2012.
Ma, "Online Supervisory and Optimal Control of Complex Building Central Chilling Systems", [online], dated Apr. 2008. Retrieved on Oct. 29, 2012 from URL:<http://repository.lib.polyu.edu.hk/jspui/bitstream/10397/3415/2/b2239753x_ir.pdf>.
Martin, "Optimal Prediction, Alarm, and Control in Buildings Using thermal Sensation Complaints", [online] Fall 2004. Retrieved on Oct. 29, 2012 from URL:<http://ti.arc.nasa.gov/m/pub-archive/archive/PhDThesis.pdf.
Trcka, "Co-Simulation for Performance Prediction of Innovative Intergated mechanical Energy Systems in Buildings", [online] Oct. 8, 2008. Retrieved on Oct. 29, 2012 from URL:<http://www.bwk.tue.nl/bps/hensen/team/past/Trcka.pdf>.
U.S. Appl. No. 12/777,803, Apr. 1, 2013 Non-Final Office Action.
U.S. Appl. No. 12/909,022, Mar. 14, 2013 Non-Final Office Action.
U.S. Appl. No. 13/646,939, Apr. 2, 2013 Non-Final Office Action.
Dutta, et al., "Estimating the Time Between Failures of Electrical Feeders in the New York Power Grid", *Next Generation Data Mining Summit*, NGDM, 5 pages (2009).
U.S. Appl. No. 13/214,057, filed Aug. 19, 2011.
U.S. Appl. No. 13/274,770, filed Oct. 17, 2011.
U.S. Appl. No. 12/178,553, Apr. 5, 2011 Issue Fee payment.
U.S. Appl. No. 12/178,553, Jan. 7, 2011 Notice of Allowance.
U.S. Appl. No. 12/178,553, Dec. 2, 2010 Response to Non-Final Office Action.
U.S. Appl. No. 12/178,553, Jun. 4, 2010 Non-Final Office Action.
U.S. Appl. No. 12/045,458, Sep. 6, 2011 Issue Fee payment.
U.S. Appl. No. 12/045,458, Jun. 3, 2011 Notice of Allowance.
U.S. Appl. No. 12/045,458, May 10, 2011 Response to Non-Final Office Action.
U.S. Appl. No. 12/045,458, Jan. 10, 2011 Non-Final Office Action.
U.S. Appl. No. 12/045,458, Oct. 28, 2010 Response to Non-Final Office Action.
U.S. Appl. No. 12/045,458, Apr. 30, 2010 Non-Final Office Action.
Long et al., "Martingale Boosting", *COLT 2005, LNAI 3559*, pp. 79-94, Jun. 2005.
Auer et al., Learning Theory, 18th Annual Conference on Learning Theory, COLT 2005, Bertinoro, Italy, Jun. 27-30, 2005, Proceedings. *Lecture Notes in Computer Science*, 3559.
International Search Report and Written Opinion for PCT/US2009/037995, dated Mar. 23, 2009.
International Search Report for PCT/US2010/024955, dated Apr. 23, 2010.

(56) References Cited

OTHER PUBLICATIONS

International Search Report for PCT/US2010/036717, dated Jul. 28, 2010.

International Search Report for PCT/US2004/28185, dated Feb. 11, 2005.

International Search Report and Written Opinion for PCT/US2011/044389, dated Dec. 14, 2011.

Kong et al., "Web-based monitoring of real-time ECG data", *Computers in Cardiology*, 27: 189-192, 2000.

"The meaning and use of the area under a receiver operating characteristic (ROC) curve", Hanley et al., *Radiology*, 143: 29-36, Apr. 1982.

"Reliability centred maintenance strategy for high voltage networks", Zdrallek, Sep. 2004, *8th International Conference on Probabilistic Methods Applied to Power Systems*, pp. 332-337.

"Predicting electricity distribution feeder failures using machine learning susceptibility analysis", Gross et al., 2006, *AAAI, Proceedings of the 18th Conference on Innovative Applications of Artificial Intelligence*, pp. 1705-1711.

Shortened version of chapter 6 of the book "Artificial intelligence techniques in power systems", Warwick, *IEE Power Enineering Series 22*, 1997.

Venayagamoorthy et al., "Experimental studies with continually online trained artificial neural networks identifiers for multiple turbogenerators on the electric power grid", 2001, *IEEE*, 0-7803-7044, pp. 1267-1272.

Rajan, "Demand Side Management Using Expert Systems: 2003, TENCON 2003,Conference on Convergent Technologies for Asia-Pacific Region" *IEEE*, 0-7803-7651.

Rudin et al., "Predicting Vulnerability to Serious Manhole Events in Manhattan: A Preliminary Machine Learning Approach", Submitted for Journal, Dec. 2008, Retrieved online on Nov. 29, 2011 at : <http://www1.ccls.columbia.edu--rudin/RudinEtAI2008_ManholeEvents.pdf>, Entire Document.

Barry et al., "Applications of Learning Classifier Systems, Data Mining using Learning Classifier Systems", Springer, May 27, 2004, pp. 15-67, Retrieved online Nov. 29, 2011 at : <http://books.google.com/books?id=aBljqGag5-kC&lr=&source=gbs_navlinks_s>.

U.S. Appl. No. 13/479,198, filed May 23, 2012.

U.S. Appl. No. 13/274,770, Jun. 8, 2012 Notice of Abandonment.

U.S. Appl. No. 13/589,737, filed Aug. 20, 2012.

U.S. Appl. No. 13/589,916, filed Aug. 20, 2012.

U.S. Appl. No. 12/885,800, Nov. 6, 2012 Response to Non-Final Office Action.

U.S. Appl. No. 12/885,800, Jul. 9, 2012 Non-Final Office Action.

Bickel, et al., "Semiparametric Inference and Model", Sep. 5, 2005 [retrieved on Jul. 23, 2012] Retrieved from the internet: URL:http://www.stat.washington.edu/jaw/JAW-papers/NR/jaw-BKR-EncylSS.pdf entire document.

Liu, et al., "Weighted Nonparametric Maximum Likelihood Estimate of a Mixing Distribution in Nonrandomized Clinical Trials", Feb. 20, 2006 [retrieved on Jul. 23, 2012] Retrieved from Internet: URL:HTTP://www.stat.purdue.edu/~junxie/Papers/weightedSBR.pdf> entire document.

Cameron, "Microeconometrics: Methods and Applications", *Cambridge University Press*, p. 333 (2005).

Bhatt, "The Application of Power Quality Monitoring Data for Reliability Centered Maintenance" EPRI (Electric Power Research Institute, Inc.) 152 pages (2000).

International Search Report and Written Opinion for PCT/US2009/037996, dated May 19, 2009.

International Search Report and Written Opinion for PCT/US2012/050439, dated Oct. 22, 2012.

International Search Report and Written Opinion for PCT/US2012/033309, dated Aug. 1, 2012.

Amoedo, "A Structured Methodology for Identifying Performance Metrics and Monitoring Maintenance Effectiveness", *M.S. Dissertation, University of Maryland, College Park, United States*, (2005).

Barabady, et al. "Availability Allocation Through Importance Measures", *The International Journal of Quality & Reliability Management*, 24(6):643-657 (2007).

Chen, "Distributed Multi-Modal Human Activity Analysis: From Algorithms to Systems", *Ph.D. dissertation, Princeton University, United States, New Jersey*, (Retrieved Mar. 25, 2012).

Hobbs, "Optimization Methods for Electric Utility Resource Planning", *European Journal of Operational Research*, pp. 1-20 (May 18, 1995).

Keeney, et al., "Evaluating Improvements in electricity Utility Reliability at British Columbia Hydro", *Operations Research*, 43(6):933-947 (Nov./Dec. 1995).

Naidu, et al., "An Empirical Model for Maintenance Strategy Selection Based on Organization Profit", *Proceedings of the 2009 Industrial Engineering Research Conference*, pp. 1765-1770 (Jan. 2009).

Chambal, "Advancing Reliability, Maintability, and Availability Analysis Through a Robust Simulation Environment", *Ph.D. Dissertation, Arizona State University, United States* (1999).

Chen, "Performance and Control of Parallel Multi-Server Queues with Applications to Web Hosting Services", *Ph.D. Dissertation, The Pennsylvania state University, United States* (2006).

* cited by examiner

MULTIMESH SYSTEM

Using a topological
representation of 2D horizons

Reservoir tops

The IBM MultiMesh system
creates a 3D grid

Input into reservoir simulator

4D SEISMIC MONITORING OF DRAINAGE

FIG.7A — Start of 4D management (A-12, A-22)

FIG.7B — 8 months later (A-12, A-22)

FIG.7C — another 4 months later (A-12, A-22)

FIG.7D — and another 3 months later (A-12, A-22)

Representation of the movement over time of oil (■) toward two wells plotted on a reservoir horizon. These four snapshots of drainage patterns were made by the 4D SeisRes system from interpolations using the reservoir simulator calibrated to 3D seismic surveys made at (a) and (d) 15 months apart.

Permeability is varied from node to node of the reservoir multimesh to match flow rates of oil and gas by minimizing errors in predicted vs. observed production histories of the wells and changes in 4D seismic amplitude over the 15-month period.

FIG.8

MARTINGALE CONTROL OF PRODUCTION FOR OPTIMAL PROFITABILITY OF OIL AND GAS FIELDS

CROSS-REFERENCE TO RELATED APPLICATIONS

This application claims the benefit of U.S. provisional patent application No. 60/886,453 entitled "MARTINGALE CONTROL OF 4D RESERVOIR PERFORMANCE PROVIDES CONSTANT WATCH ON FIELD PROFITABILITY" filed on Jan. 24, 2007. Further, this application is a continuation-in-part of U.S. patent application Ser. No. 11/349,711 entitled "INNERVATED STOCHASTIC CONTROLLER FOR REAL TIME BUSINESS DECISION MAKING SUPPORT" filed Feb. 8, 2006 now U.S. Pat. No. 7,395,252 as a continuation of International patent application No. PCT/US04/28185 filed on Aug. 26, 2004 claiming priority to U.S. provisional patent application No. 60/497,834 filed on Aug. 26, 2003. All of the aforementioned priority applications are hereby incorporated by reference in their entireties herein.

BACKGROUND

This disclosure relates to systems and methods for managing oil and gas fields. In particular, the invention relates to computer-aided lean management ("CALM") of hydrocarbon production from oil and gas fields or subsurface reservoirs.

Computer-aided management techniques have been beneficially used to increase efficiencies in complex product manufacturing enterprises such as aircraft manufacturing. Computer-aided lean management (CALM) techniques involve a feedback loop between actions taken on the production floor and the return of metrics that score the success or failure of those actions.

In the context of hydrocarbon resources, an "e-Field" is an integrated asset model of the physical equipment and electronic infrastructure, for real-time remote monitoring and control of gas, oil, and water production in ultra deepwater and unconventional gas fields. See, e.g., Thomas et al. U.S. Pat. No. 6,266,619 ("Thomas").

The tracking of fluid drainage over time (called "4D") is a modern development aimed at improving reservoir monitoring. 4D has introduced several powerful new observational tools into the development engineering arsenal, such as time-lapse seismic differencing, fiber-optic monitoring arrays in casing, and downhole sensors of many types.

This 4D application holds great promise as the keystone of a new, integrated reservoir management strategy that is able to image changes not only within a reservoir but also within the stack of reservoirs that make up most of the oil and gas fields of the world today.

Yet the industry is only just developing the controller logic for many components of 4D monitoring. For example, 4D seismic monitoring is still centered on reacquisition using 3D methodologies that are hard to reproduce or duplicate exactly. Consequently, field operators concentrate on seismic reprocessing and reinterpretation, instead of the differencing of time-lapse data itself.

In addition, conventional seismic modeling is 1D and 2D, rather than 3D like the earth. Further, seismic modeling is usually acoustic rather than elastic, which is more expensive. To add to the simplification, seismic modeling analysis is built around one reservoir at a time, instead of the system of stacked reservoirs as an integrated whole.

Anderson et al., U.S. Pat. No. 6,826,483, which is incorporated by reference in its entirety herein, describes a 4D system and method for managing and optimizing data handling and analysis over a period of time relative to a characterization of the state, location, and quantity of fluids within a subterranean petroleum reservoir. The system and method are based on a networked operating framework ("OF") that sources, then integrates, multi-vendor scientific, business, and engineering applications and data sets. The OF manages, versions (i.e. times), and coordinates execution of multiple applications. It handles the trafficking of data between applications; updates geospatially aligned earth and reservoir models; and orchestrates the outcomes through optimization loops. The OF infrastructure (referred to herein as a "middleware framework") allows for very large volume data sets to be configured and efficiently transported among disparate geological, geophysical, and engineering software applications, the looping through of which is required to determine accurately the location over time of the oil and gas within the reservoir relative to the surrounding water in the rock matrix. The OF infrastructure includes software to track the progress of the workflow throughout the history of computation around the loop, including the versioning (i.e., keeping track of, accounting for, and/or recording changes) over time of the various data and results.

Anderson's computational operating framework (OF) allows for the seamless and rapid feedback between and among the many and varied software applications and data streams that are required for modern reservoir management. This computational operating framework is missing from prior art e-field and smart-field controllers.

Anderson et al. U.S. patent application Ser. No. 11/349,711 provides systems and methods for computer-aided lean management (CALM) of enterprises. A stochastic controller system is used to optimize decision making over time. A unified reinforcement learning algorithm is implemented to treat multiple interconnected operational levels of enterprise processes in a unified manner. A forward model of the enterprise processes is used to train the unified reinforcement learning algorithm to generate optimal actions over time.

The stochastic controller system can be configured to carry out remote sub-sea decisions in real time, affecting the form and timing of gas, oil, and water production in ultra deepwater. An integrated reservoir asset and production model is developed. The model may include production constraints based, for example, on skin damage and water coning in wells. The stochastic controller is trained to generate flexible production/injection schedules that honor production constraints and produce exemplary field production shapes. The flexible production/injection schedules can be optimized on the basis of total economic value increase (real option value+ NPV) by the controller.

Reservoir evaluation and characterization generically (including but not limited to that using seismic, non-seismic, and hybrid data analysis) will be referred to herein as "SeisRes OF." Further, seismic/reservoir modeling integration of CALM software will be referred to herein as "4D SeisRes," or "4D Seismic Reservoir Management."

Consideration is now being given to an implementation of a CALM controller system for 4D Seismic Reservoir Management, which is focused on the need to maximize profitability of the whole enterprise through all times and under all uncertainties. A desirable CALM controller will integrate observed 4D seismic differences with a continuously running reservoir simulator to understand the production pathways of fluid withdrawal in each field.

SUMMARY

This disclosure provides "real options" management of hydrocarbon production from wells through feedback of economic and reservoir conditions to an optimizer that varies the chokes and production profiles of well producers and injectors simultaneously to manage production through time for optimal profitability.

The optimizer is integrated with a multi-component 4D Seismic Reservoir Management system, which includes verified seismic differencing schemes, both amplitude and time-shift imaging to bring out the 4D changes over time, petrophysical and rock mechanical studies and follow-up, and continuous monitoring from sensors embedded in the sea floor and wellbores.

A computer-aided lean management (CALM) controller system for managing oil and gas field production with a view to optimize profitability is coupled with an e-field representation of the field (e.g., 4D SeisRes). The multi-component 4D Seismic Reservoir Management system includes a plurality of applications describing a multiplicity of dynamic and static e-field properties and conditions. The system monitors the reservoir conditions, tracks actions taken, and uses machine-learning continuously in real time. The workflow of these applications is combined in a feedback loop. A learning model continuously recomputes optimal solutions, strategies or actions to keep the next actions "always-in-the-money."

The system can generate or predict in-the-money actions even as reservoir/field properties and conditions change with time. Implementing such actions can advantageously increase profitability of the reservoir over its lifetime.

BRIEF DESCRIPTION OF THE DRAWINGS

Further features of the disclosed subject matter, its nature, and various advantages will be more apparent from the following detailed description of the preferred embodiments and the accompanying drawings, wherein like reference characters represent like elements throughout, and in which.

DESCRIPTION

This disclosure provides a CALM controller system for managing oil and gas field production with a view to optimize profitability. The CALM controller system for 4D Seismic Reservoir Management is designed to focus on the need to maximize profitability of the whole at all times and under all uncertainties. The CALM controller system integrates the observed 4D seismic differences with a continuously running reservoir simulator to understand the production pathways of fluid withdrawal in each field. The CALM controller system includes a feedback loop between actions taken in the field and the return of metrics that score the success or failure of those actions. This feedback is fed into a model that continuously recomputes optimal solutions, strategies or actions to keep the next actions "always-in-the-money." Such a feedback loop in control system simultaneously optimizes both economic value and operational aspects of "e-fields" is called a "Martingale" controller.

The CALM Martingale controller system ("CALM Martingale 4D SeisRes controller system") disclosed herein is an implementation of the general stochastic controller described in Anderson et al. U.S. patent application Ser. No. 11/349,711. The system integrates diverse and multiple software applications and models using a feedback loop.

Figure 1:
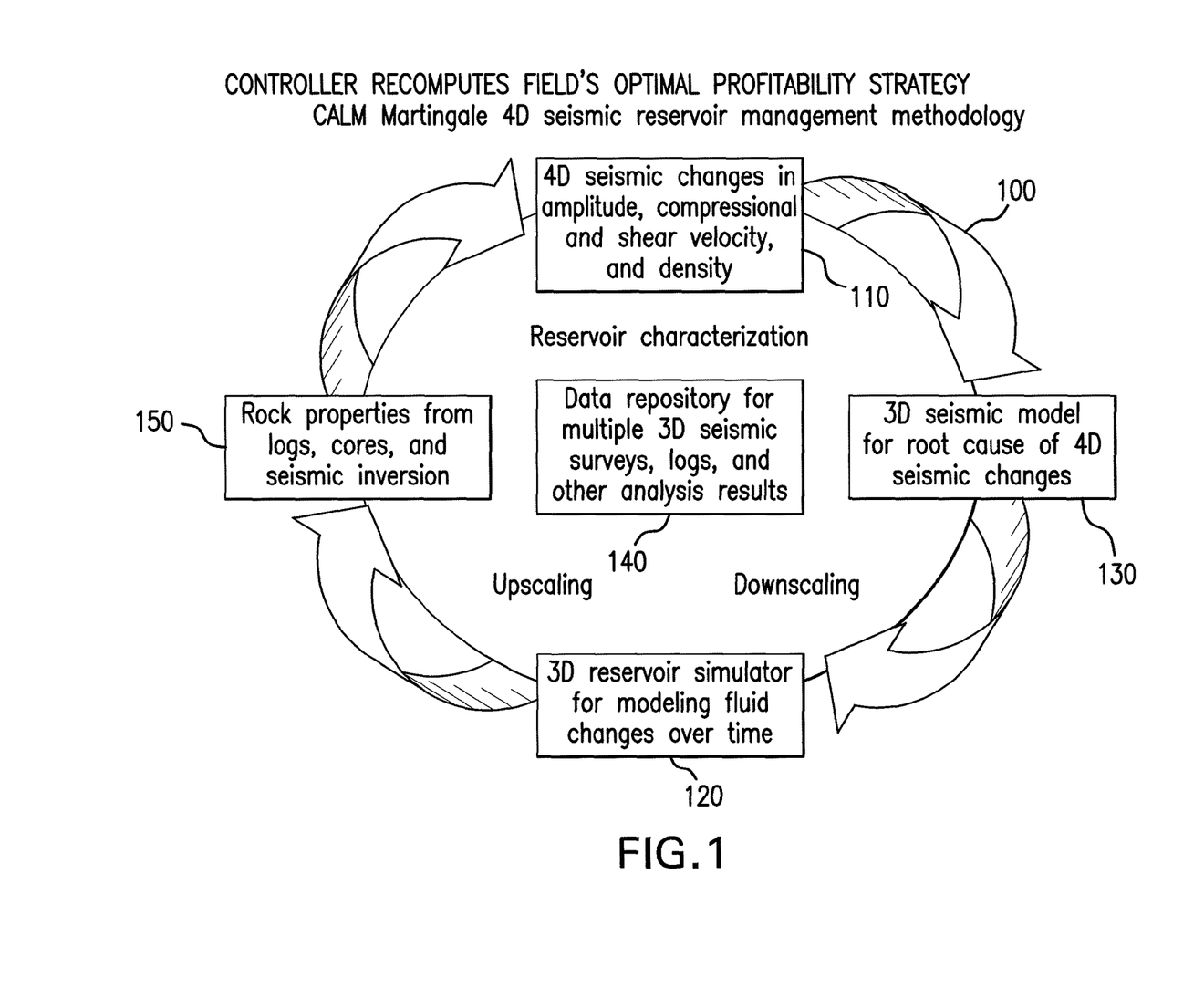
FIG. 1 is an illustration of a feedback loop in an exemplary implementation of the CALM Martingale controller system for 4D seismic reservoir management for optimal profitability in accordance with the principles of the present invention.

FIG. 1 shows a feedback loop 100 in an exemplary implementation of the CALM Martingale controller system for 4D seismic reservoir management for optimal profitability. The system generates a strategy (i.e., actions) for optimal profitability of the reservoir through time. The CALM controller integrates the observed 4D seismic differences 110 with a continuously running reservoir simulator 120 to understand the production pathways of fluid withdrawal in each field. Advantageously, the CALM system maximizes profitability even with extreme price fluctuations and geological uncertainties.

Exemplary feedback loop 100 includes the following workflow combinations:

1. 4D analysis of time-lapse seismic changes (e.g., amplitude, compressional and shear velocity) for at least two, but as many as practical, 3D seismic volumes acquired at different times during the production history of a field, and their time-depth conversion, normalization, and differencing;
2. Well log analysis looking for time-lapse changes in the logs run over several different time intervals in wells and their time-depth conversion;
3. Reservoir characterization of stacked reservoirs using geostatistical co-kriging;
4. Exporting of all data, with time-stamps, into the same earth model;
5. 3D fluid flow simulation, preferably using finite element modeling;

6. 3D seismic modeling, preferably elastic rather than acoustic, to generate synthetic seismic cubes to match the 4D seismic observation time steps;
7. Differencing of 4D model vs. 4D observed seismic data (e.g., difference between model and observed data for a given time);
8. Analysis of the difference-of-the-differences between the model and observed results (e.g., the difference between the predicted-observed differences at two times);
9. Optimization that identifies changes in physical properties of the reservoirs that are required to match fluid withdrawal, pressure changes, and seismic differences as closely as possible; and
10. A continuous "feedback loop" to workflow 1 above so that the computation is dynamic. The computations can be continuous (e.g., 24 hrs/7 days a week) until the field is abandoned.

The CALM Martingale 4D SeisRes controller system is designed to perform the computational tasks of interacting 3D seismic modeling 130 with statistical reservoir characterization 140, 4D observed seismic differences, a finite element reservoir simulator 120, and properties derived from seismic inversion and migration codes 150.

For this purpose, an exemplary implementation of the CALM Martingale 4D SeisRes controller has an extensible operating framework (OF) that enables the interpretation workflow to move easily among various vendor applications needed to complete feedback loop 100 (FIG. 1). The interpretation workflow may include geological and geophysical interpretations, and engineering implementations required for optimal performance by modern e-field asset teams.

Figure 2:
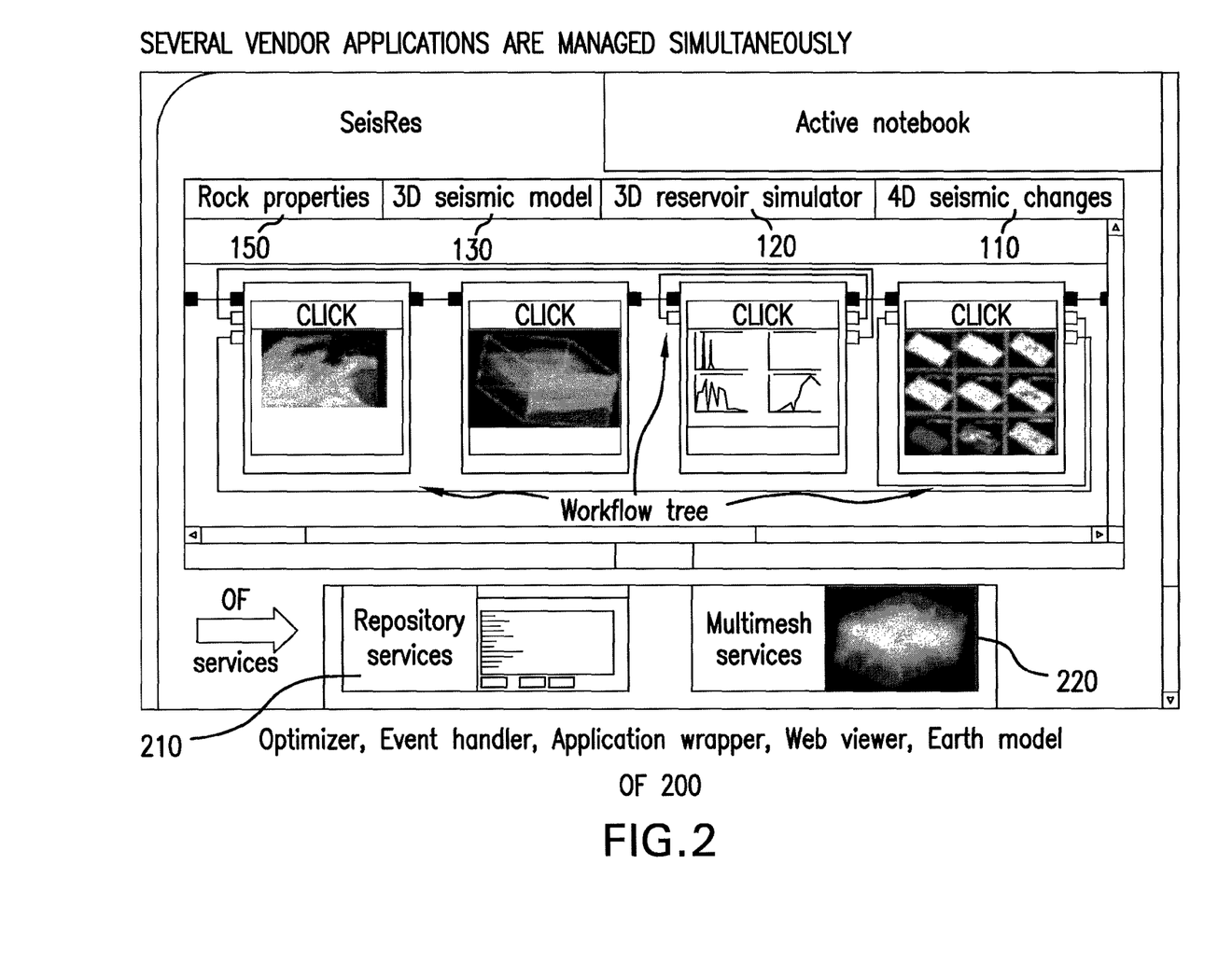
FIG. 2 is an illustration of a web-based action tracker ("Active Notebook"), which records and/or displays actions within any of the many applications of component subsystems of the system of FIG. 1, in accordance with the principles of the present invention.

FIG. 2 shows the architecture of OF 200 for the exemplary system implementation of CALM Martingale 4D SeisRes controller. OF 200 includes major geological, geophysical, and engineering components or subsystems (e.g., Rock Properties, 4D seismic Model, 3D Reservoir simulator, 4D Seismic changes, etc.), which are managed simultaneously.

In OF 200, all actions within any of the many applications of the system or component subsystems are recorded within the OF using a web-based action tracker (hereinafter "Active Notebook"). Like a laboratory scientist's lab book, Active Notebook allows any previous experiment to be redone.

OF 200 also includes a vendor-neutral data model with a persistent input/output data repository 210 is required because the data sources for the various users' favorite applications are not likely to be kept in the same data management systems. Rapid reviews of present and previous analyses can then be quickly and easily reviewed via versions stored in the data repository.

OF 200 may provide user-selectable access to various vendors' applications using automated "wrappers" (FIG. 2). For example, OF 200 may allow a user to choose between popular reservoir simulators (e.g., Schlumberger (Eclipse) and Halliburton (VIP) simulators, etc.) at the same time. The wrappers enclose the vendor applications and automatically manage the connectivity, data trafficking, and versioning of inputs and outputs.

OF 200 includes an "event handling" mechanism to make applications run asynchronously (i.e., in parallel, but not necessarily at the same time). The workflow is parsed among the several parallel applications simultaneously and distributed to the client/server network, and then reassembled as it is completed. With this feature, OF 200 does not have to wait for one program to finish before beginning another.

In exemplary embodiments of the implementation of the CALM Martingale 4D SeisRes controller, OF 200/data repository 210 is configured to have a rich set of reusable, extensible "containers" to hold engineering, geological, and geophysical data so that new applications and data types can be added to the OF management system easily and quickly.

Figure 3:
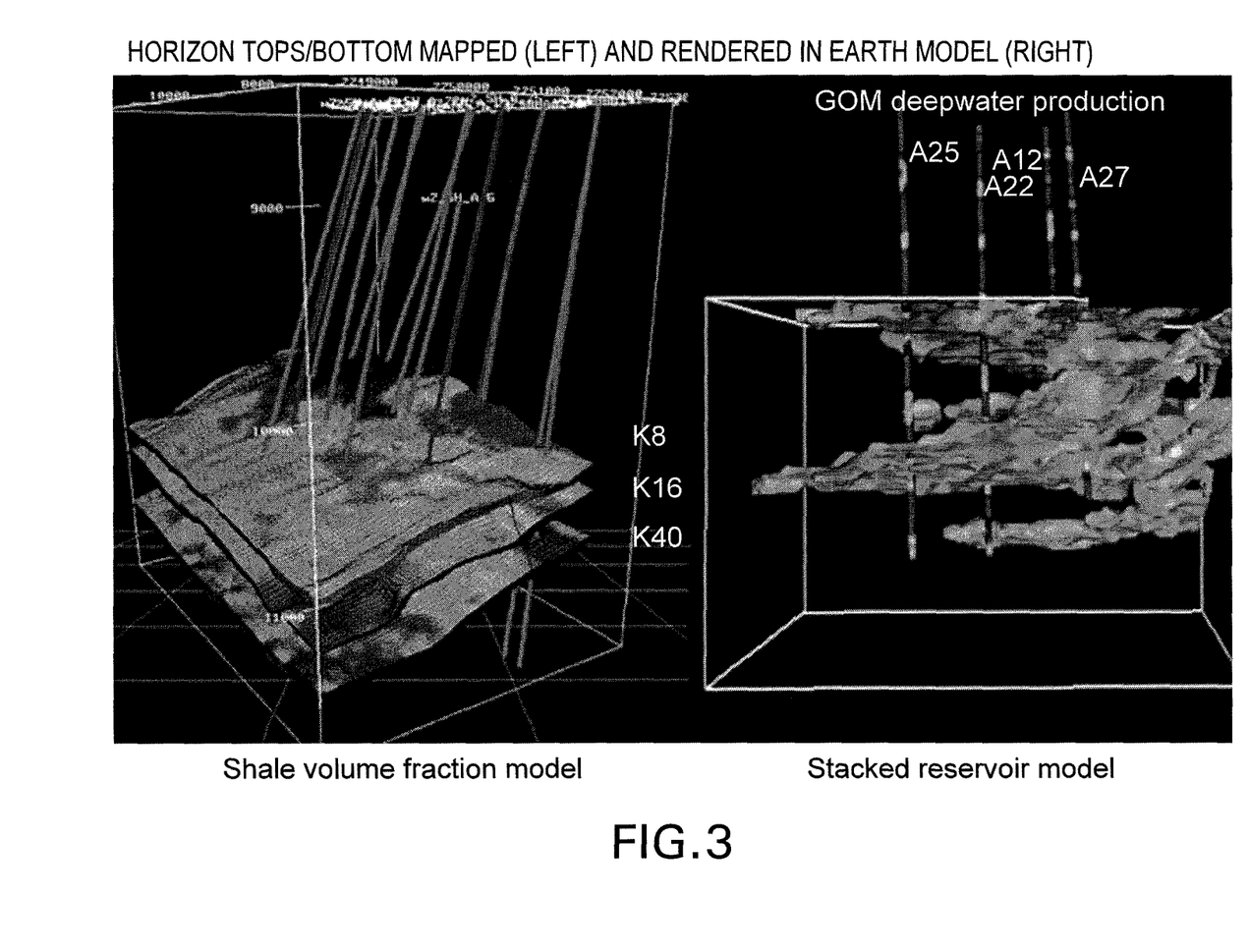
FIG. 3 is an illustration of reservoir horizons (tops and bottoms) mapped and rendered in a stacked reservoir model, which is generated by the system of FIG. 1 and displayed on the web-based action tracker of FIG. 2, in accordance with the principles of the present invention.

In an implementation of the CALM Martingale 4D SeisRes controller, OF 200 includes an automated meshing system 220 to create the framework needed by the reservoir simulator to build its model from any set of stacked horizons or other geological interpretations such as scanned maps and charts. FIG. 3 shows, for example, OF 200 displays of reservoir horizons (tops and bottoms) mapped and rendered in a stacked reservoir model.

Figure 4:
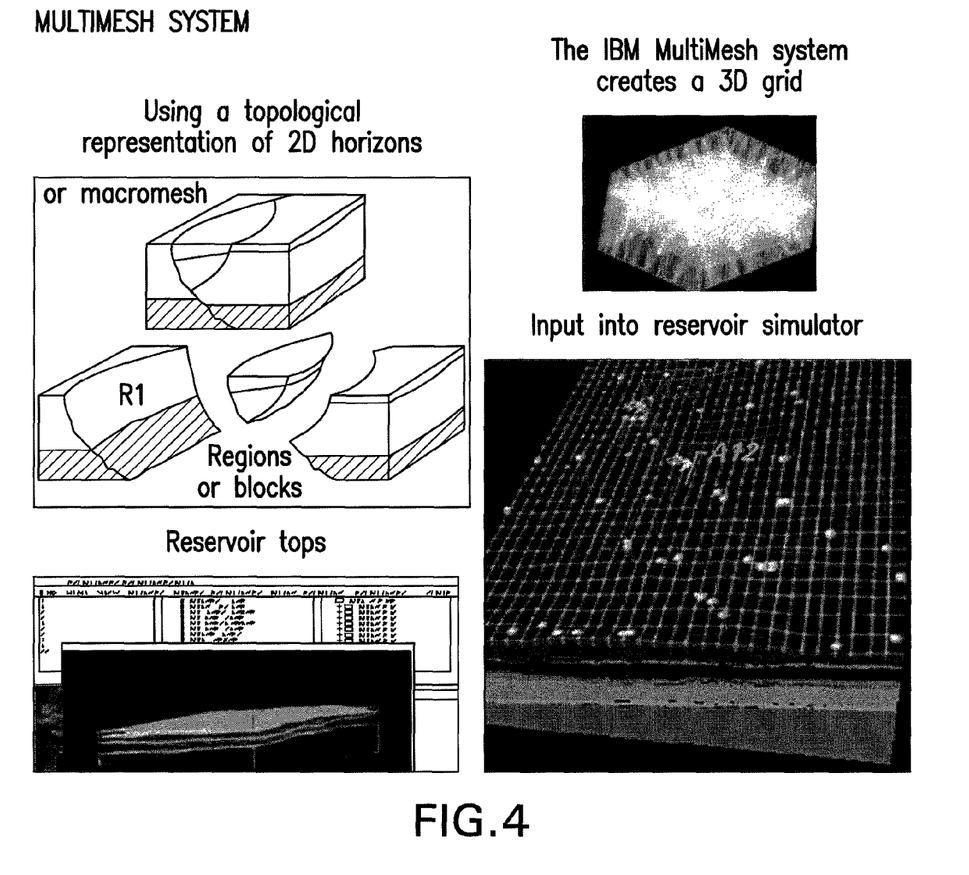
FIG. 4 is an illustration of an exemplary automated meshing system which creates a 3D grid by using a topological representation of 2D horizons and reservoir tops for input into a reservoir simulator used in the system of FIG. 1, in accordance with the principles of the present invention.

Automated meshing system 220 (e.g., "MultiMesh" by IBM) is advantageously "topological" so that whatever the grid requirements of an application are, its 3D connectivity can be quickly computed in finite difference, finite element, upscaled, or downscaled versions as needed (FIG. 4).

Further, OF 200 may be provided with a common data viewer (e.g., a web-based visualization system) that crosses applications. The user can then communicate the visualization of progress of his computer simulations over the web as colleagues around the world manipulate the images in real time as they are recomputing (FIGS. 5A and 5B).

In addition to the OF 200 components discussed above, the CALM Martingale 4D SeisRes controller system includes an optimizer, which provides parameter optimization services. Since the CALM Martingale 4D SeisRes controller system is implemented as a loosely coupled, component-based system, the need for parameter estimation varies from application to application and vendor to vendor. The optimizer contains a set of tools that can be deployed at any time and any place within SeisRes OF 200. This feature effectively provides the user with an "optimization laboratory or workbench."

The "optimization workbench" allows the user a selection of options, including hybrids that combine algorithms of different types, to produce the most appropriate solutions. In practice, the technical goal is to quickly implement sub-optimization loops to facilitate the optimization process for the 4D seismic reservoir simulation.

Figure 5A:
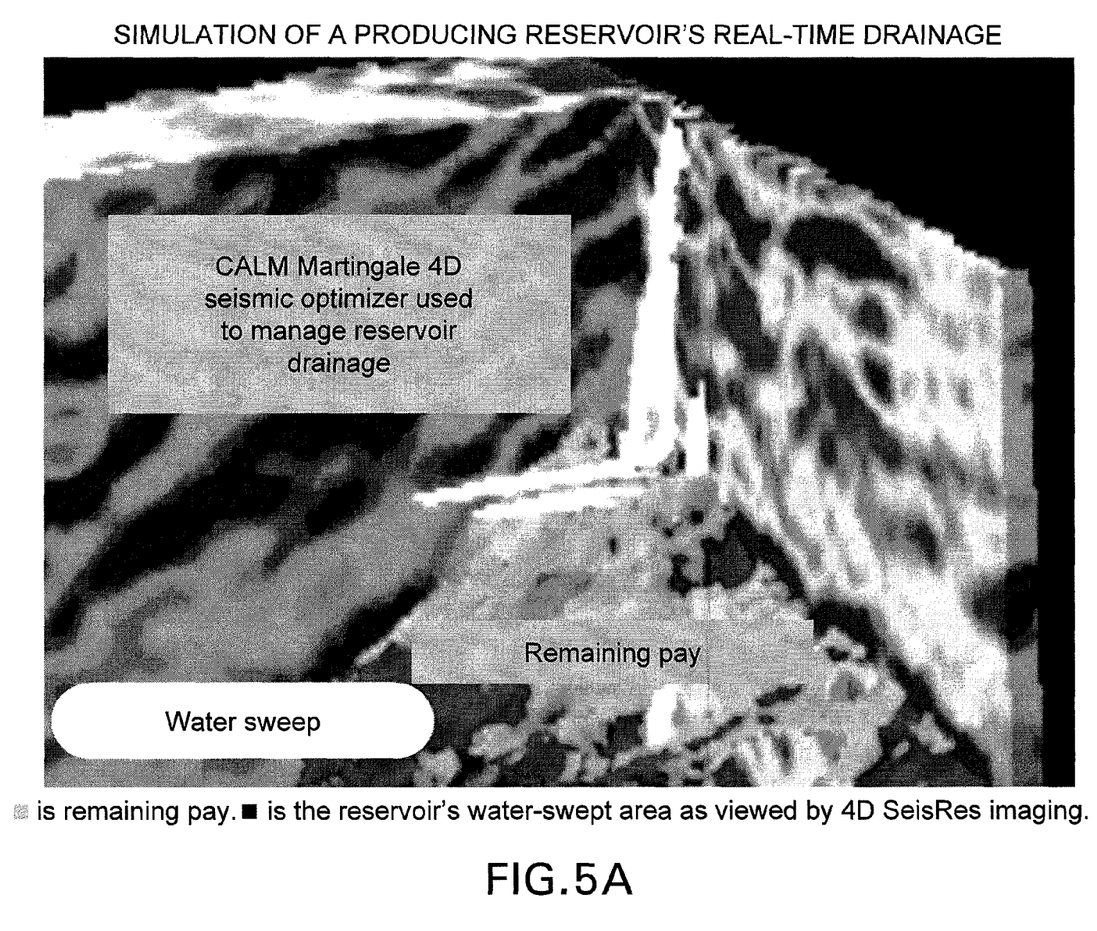
FIG. 5A is an exemplary web-display of a producing reservoir's real-time drainage simulated by the system of FIG. 1, in accordance with the principles of the present invention.
Figure 5B:
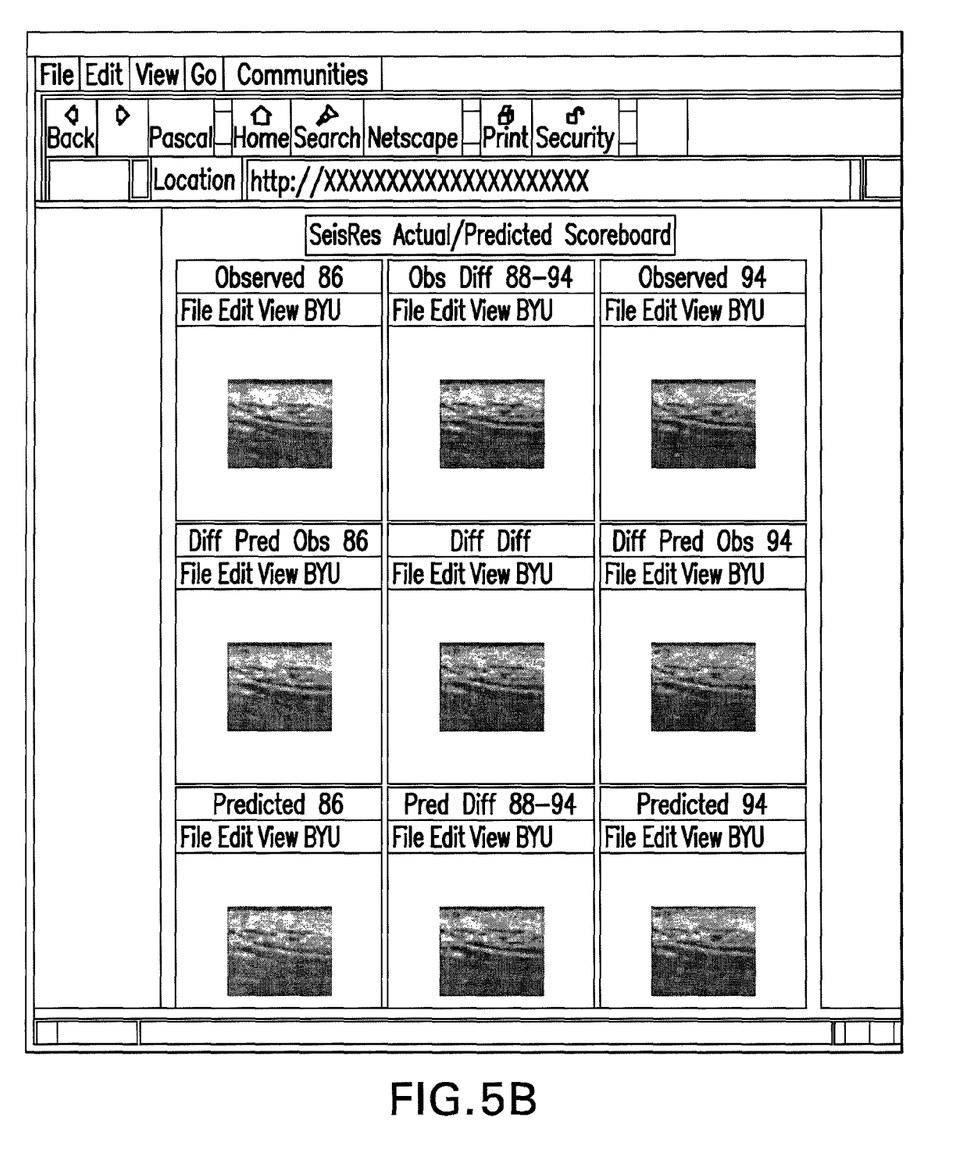
FIG. 5B is another exemplary web-display of a producing reservoir's drainage over time simulated by the system of FIG. 1, in accordance with the principles of the present invention.
Figure 6:
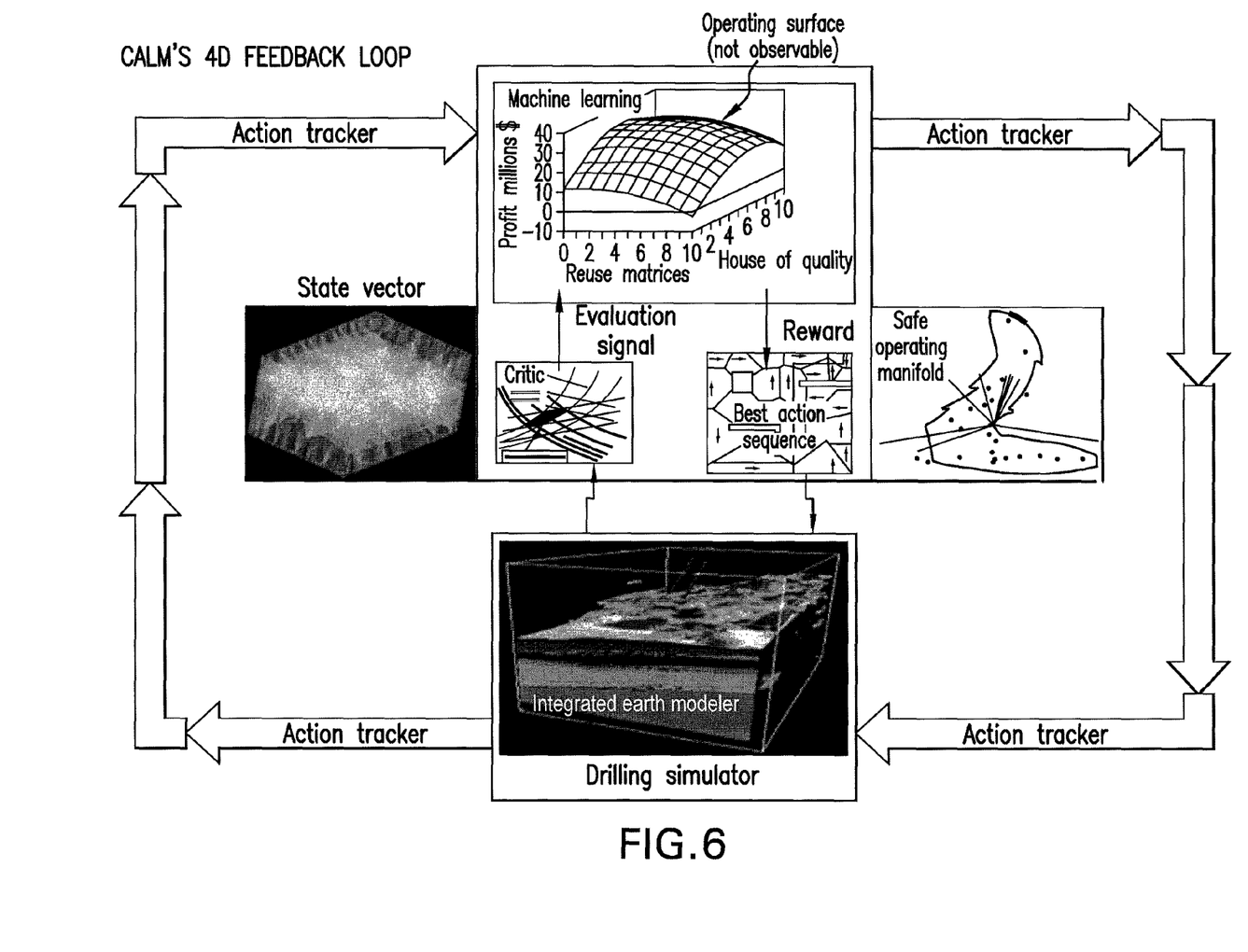
FIG. 6 is a schematic illustrating the operation of the CALM Martingale 4D SeisRes controller system, in accordance with the principles of the present invention.
Figure 7A:
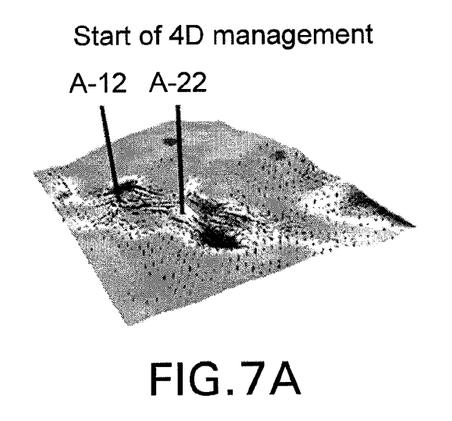
FIG. 7 is an illustration of the movement over time of oil toward two wells plotted on a reservoir horizon.
Figure 7B:
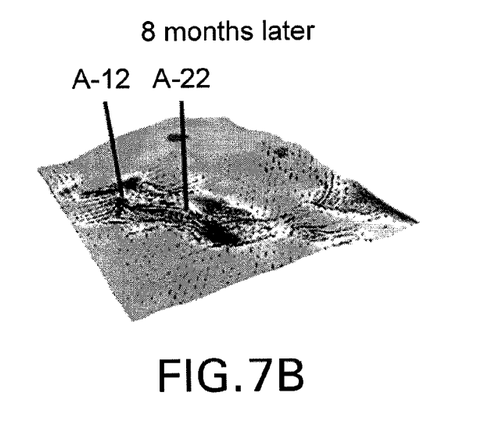
Figure 7C:
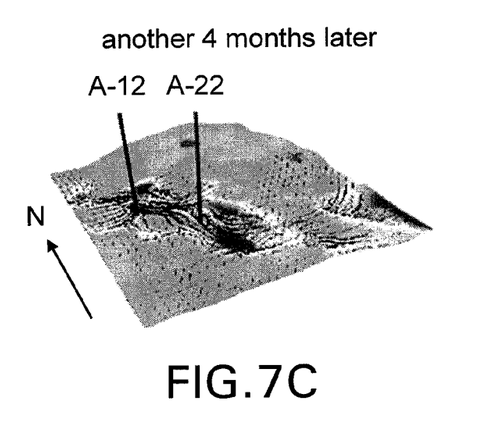
Figure 7D:
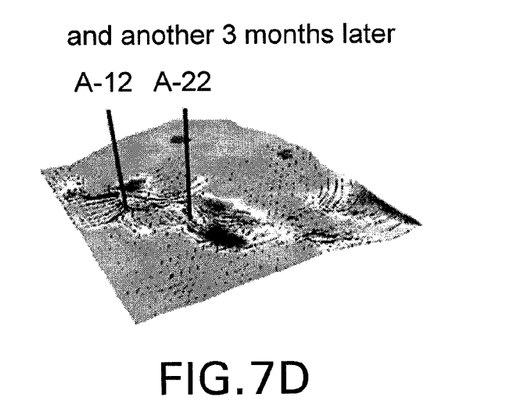

Consider application of the CALM Martingale 4D SeisRes controller system to an exemplary problem of tracking drainage of oil from a reservoir by two wells over a 15-month period (FIG. 5A). For this problem, an exemplary optimizer may include three components: optimization solvers, forward simulation wrappers, and simulation data converters, each of which must be developed separately for reservoir property characterization, reservoir simulation, petrophysical property characterization, and 3D seismic simulation. The optimizer converges on a single "best approximation" result that simultaneously solves for permeability variations and flow rate changes, with error estimates for each. FIG. 6 schematically shows the operation of the CALM Martingale 4D SeisRes controller system in this application. The controller system monitors the reservoir conditions, tracks actions taken, and uses machine learning continuously in real time, to generate a best action sequence. The best action sequence, for example, is constrained, for example, to ensure maximum profitability of the reservoir at a give time or cumulatively.

FIG. 5B is an exemplary web-display of a producing reservoir's drainage over time as simulated the CALM Martingale 4D SeisRes controller system. The figure shows a 3×3 grid of several amplitude mapping plots (e.g., observed, predicted, observed-observed difference, observed-predicted difference, predicted-predicted difference, and observed difference-predicted difference plots) displayed in the web-based viewer.

The CALM Martingale 4D SeisRes controller system provides a modern, real-time reservoir management system that is able to characterize multiple, sequential 4D seismic surveys; seismic attribute volumes that vary with offset; many repeated well logs of different types and vintages; geostatistically-derived data volumes in both spatial and "stratigraphic" grids; 3D fluid saturation volumes and fluid-flow maps; fluid-interface monitors, multiple horizons and fault surfaces, and other data types that are at present only on the R&D drawing board (FIG. 7).

FIG. 7 shows the movement over time of oil toward two wells plotted on a reservoir horizon. The four snapshots (a)-(d) of drainage patterns were made by the 4D SeisRes system from interpolation using the reservoir simulator calibrated by 3D seismic surveys made at (a) and (d) 15 months apart.

Figure 8:
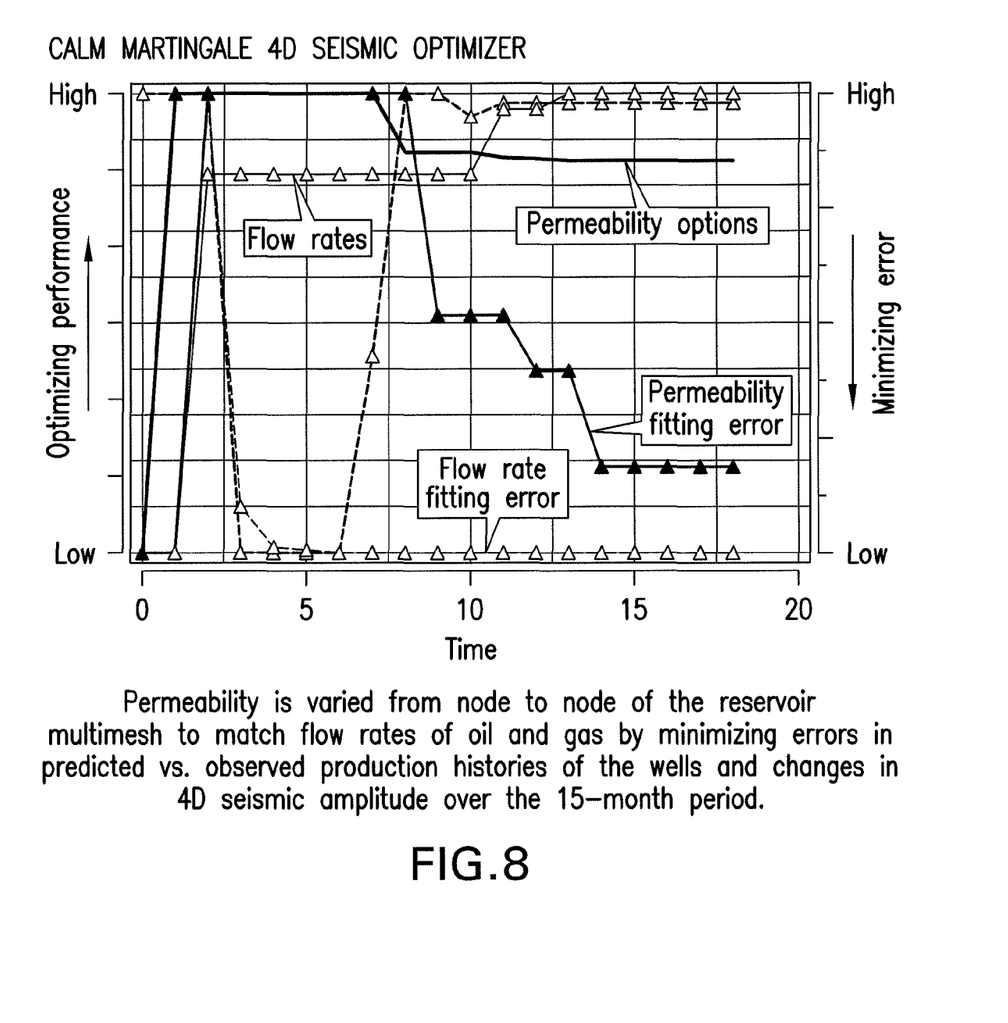
FIG. 8 is an illustration of an exemplary output of the CALM Martingale 4D system optimizer of FIG. 1, when permeability is varied from node to node of the reservoir multimesh to match flow rates of oil and gas by minimizing errors in predicted vs. observed production histories of the well and changes in 4D seismic amplitude over the 15-month period, in accordance with the principles of the present invention.

FIG. 8 shows exemplary output of the CALM Martingale 4D system optimizer when permeability is varied from node to node of the reservoir multimesh to match flow rates of oil and gas by minimizing errors in predicted vs. observed production histories of the well and changes in 4D seismic amplitude over the 15-month period.

The CALM Martingale 4D SeisRes controller system takes a global view of all these different types of data, which are spatially registered with respect to one another in the local real-world coordinate system and rendered in a variety of modes so that the interrelationships can be perceived. This global view is a key to martingale control of an e-field, so that CALM Martingale 4D SeisRes controller system will deliver profitability that is "always-in-the-money."

In accordance with the present disclosure, software (i.e., instructions) for implementing the aforementioned controllers and systems can be provided on computer-readable media. It will be appreciated that each of the steps (described above in accordance with this invention), and any combination of these steps, can be implemented by computer program instructions. These computer program instructions can be loaded onto a computer or other programmable apparatus to produce a machine, such that the instructions, which execute on the computer or other programmable apparatus create means for implementing the functions of the aforementioned controllers and systems. These computer program instructions can also be stored in a computer-readable memory that can direct a computer or other programmable apparatus to function in a particular manner, such that the instructions stored in the computer-readable memory produce an article of manufacture including instruction means which implement the functions of the aforementioned controllers and systems. The computer program instructions can also be loaded onto a computer or other programmable apparatus to cause a series of operational steps to be performed on the computer or other programmable apparatus to produce a computer implemented process such that the instructions which execute on the computer or other programmable apparatus provide steps for implementing the functions of the aforementioned innervated stochastic controllers and systems. It will also be understood that the computer-readable media on which instructions for implementing the aforementioned controllers and systems are be provided, include without limitation, firmware, microcontrollers, microprocessors, integrated circuits, ASICS, and other available media. It will be understood that the foregoing is only illustrative of the principles of the invention, and that various modifications can be made by those skilled in the art, without departing from the scope and spirit of the invention, which is limited only by the claims that follow.

What is claimed is:

1. A computer-aided lean management (CALM) controller system for managing production actions in an oil and gas reservoir/field as its properties and conditions change with time with a view to increase profitability of the reservoir over its lifetime, wherein the oil and/or gas reservoir is characterized and represented as an electronic-field ("e-field"), the system comprising:

a plurality of applications describing a multiplicity of dynamic and static e-field properties and conditions, each application having a workflow, wherein the plurality of application workflows are combined in a feedback loop between actions taken in the field and metrics that score the success or failure of those actions in the field; and a martingale controller that operates on the combination of the application workflows and continuously computes production strategies and physical actions on an oil and gas reservoir/field, wherein the martingale controller is configured to generate a best temporal action sequence for production in which a future-looking real option value representing one of the actions is used as at least one basis for determining the best action sequence thereby ensuring increased profitability of the reservoir over its lifetime.

2. The system of claim 1, wherein the feedback loop connects the following workflows:

4D analysis of time-lapse seismic changes for at least two 3D seismic volumes acquired at different times during the production history of the field, and their time-depth conversion, normalization, and differencing;

well log analysis looking for time-lapse changes in the same logs run over several different time intervals in wells and their time-depth conversion;

reservoir characterization of stacked reservoirs using geostatistical co-kriging;

exporting of all data, with time-stamps, into a same earth model;

3D fluid flow simulation;

3D seismic modeling to generate synthetic seismic cubes to match the 4D analysis of time-lapse seismic changes;

differencing of 4D model vs. 4D observed seismic data;

analysis of the difference-of-the-differences between the model and observed results; and optimization that identifies changes in physical properties of the reservoirs that are required to match fluid withdrawal, pressure changes, and seismic differences.

3. The system of claim 1 comprising interacting 3D seismic modeling with statistical reservoir characterization applications, a 4D observed seismic differences application, a finite element reservoir simulator, and seismic inversion and migration codes.

4. The system of claim 3, comprising an operating framework (OF) that enables interpretation workflow to move easily among diverse vendor applications needed to complete feedback loop, wherein the interpretation workflow includes geological and geophysical field interpretations, and engineering implementations required for optimal performance by electronic oil field asset teams.

5. The system of claim 4, wherein the OF comprises a rock property data application, a 4D seismic Model, a 3D reservoir simulator, and a 4D seismic change application.

6. The system of claim 4, wherein all actions within any component application of the OF are recorded using a web-based action tracker.

7. The system of claim 4, wherein the OF includes a vendor-neutral data model with a persistent input/output data repository.

8. The system of claim 4, wherein the OF is configured to provide user-selectable access to diverse vendors' applications using automated wrappers.

9. The system of claim 4, wherein the OF comprises an event handling mechanism to make OF component applications run asynchronously.

10. The system of claim 4, wherein the OF comprises an automated meshing application to create a framework needed by the reservoir simulator to build its model from any set of stacked horizons or other geological interpretations.

11. The system of claim 1 comprising an optimizer, which provides parameter optimization services.

12. The system of claim 11 wherein the optimizer comprises a set of tools that can be deployed at any time and any place within the system.

13. The system of claim 12 wherein the optimizer comprises optimization solvers, forward simulation wrappers, and simulation data converters, each of are deployed separately for reservoir property characterization, reservoir simulation, petrophysical property characterization, and 3D seismic simulation.

14. The system of claim 11 wherein the optimizer is configured to converge on a single "best approximation" result that simultaneously solves for permeability variations and flow rate changes in the field.

15. The system of claim 11 that is configured to characterize multiple, sequential 4D seismic surveys; seismic attribute volumes that vary with offset; many repeated well logs of different types and vintages; geostatistically-derived data volumes in both spatial and "stratigraphic" grids; 3D fluid saturation volumes and fluid-flow maps; fluid-interface monitors, multiple horizons and fault surfaces and other data types.

* * * * *